United States Patent
Makin (10) Patent No.: US 9,135,266 B1
(45) Date of Patent: Sep. 15, 2015

(54) SYSTEM AND METHOD FOR ENABLING ELECTRONIC DISCOVERY SEARCHES ON BACKUP DATA IN A COMPUTER SYSTEM

(75) Inventor: Gaurav Makin, Roseville, MN (US)

(73) Assignee: SYMANTEC CORPORATION, Mountain View, CA (US)

( * ) Notice: Subject to any disclaimer, the term of this patent is extended or adjusted under 35 U.S.C. 154(b) by 276 days.

(21) Appl. No.: 13/223,630

(22) Filed: Sep. 1, 2011

(51) Int. Cl.
*G06F 7/00* (2006.01)
*G06F 17/00* (2006.01)
*G06F 17/30* (2006.01)

(52) U.S. Cl.
CPC ................ *G06F 17/30144* (2013.01)

(58) Field of Classification Search
CPC ............ G06F 17/30144; G06F 17/30917; G06F 17/30864; G06Q 10/10
USPC ............ 707/640, 706, 758, 770, 641
See application file for complete search history.

(56) References Cited

U.S. PATENT DOCUMENTS

| | | | |
|---|---|---|---|
| 7,197,520 B1 * | 3/2007 | Matthews et al. ................ | 1/1 |
| 7,895,163 B2 | 2/2011 | Kim | |
| 8,041,672 B2 * | 10/2011 | Ogawa et al. ................ | 707/609 |
| 8,112,406 B2 | 2/2012 | Paknad et al. | |
| 8,200,642 B2 | 6/2012 | Maze | |
| 8,219,974 B2 | 7/2012 | Schmidt | |
| 8,226,482 B2 | 7/2012 | Laufgraben | |
| 8,250,037 B2 | 8/2012 | Andersen et al. | |
| 2003/0217008 A1 * | 11/2003 | Habegger et al. ................ | 705/51 |
| 2007/0214384 A1 * | 9/2007 | Kitamura ................ | 714/13 |
| 2009/0292681 A1 * | 11/2009 | Wood et al. ................ | 707/3 |
| 2009/0326969 A1 | 12/2009 | Paknad et al. | |
| 2011/0093470 A1 * | 4/2011 | Gokhale et al. ................ | 707/741 |
| 2011/0119371 A1 * | 5/2011 | Toshima et al. ................ | 709/224 |
| 2011/0321124 A1 | 12/2011 | Kisin et al. | |

* cited by examiner

*Primary Examiner* — Md. I Uddin
(74) *Attorney, Agent, or Firm* — Meyertons Hood Kivlin Kowert & Goetzel (57) ABSTRACT

Various embodiments of a system and method for enabling electronic discovery (e-Discovery) searches to be performed on backup data in a computer system are disclosed. The system and method may operate to receive backup data for a set of files and backup catalog information indicating meta-data for the files, such as the data locations of the files within the backup data. The system and method may also receive event data indicating access history for the files, and may create e-Discovery mapping information based on the event data and the backup catalog information. The e-Discovery mapping information may map file access events specified by the event data may to the meta-data for the respective files in the backup data. The e-Discovery mapping information may enable the backup data to be searched to find files relevant to a legal proceeding or investigation.

12 Claims, 8 Drawing Sheets

Backup Catalog 536

| File = "File 515A" | Owner = "User 1" | Data Location Info 417A |
| File = "File 515B" | Owner = "User 3" | Data Location Info 417B |

SYSTEM AND METHOD FOR ENABLING ELECTRONIC DISCOVERY SEARCHES ON BACKUP DATA IN A COMPUTER SYSTEM

BACKGROUND OF THE INVENTION

1. Field of the Invention

This invention relates to the field of computer storage systems, and more particularly, to a system and method for implementing electronic discovery searches on backup data or archived data.

2. Description of the Related Art

Many civil litigation and investigative procedures require attorneys and paralegals to find and preserve electronic information relevant to the litigation. The process of finding, preserving, and analyzing electronic information as required by litigation or investigation is referred to as electronic discovery, or e-Discovery. E-Discovery often requires the legal team to search an organization's backup or archive storage systems to find archived information relevant to the case. Once the files are found the legal team may then evaluate them and place a legal hold on the ones that are deemed to be relevant to the investigation.

A large organization can have hundreds or thousands of computer users, and enormous amounts of backup data or archived data. The process of performing an e-Discovery search to find the relevant files from the organization's backup data can be difficult to implement.

SUMMARY

Various embodiments of a system, method and computer-accessible storage medium for enabling electronic discovery (e-Discovery) searches to be performed on backup data in a computer system are disclosed. The backup data may need to be searched to find data files relevant to a legal proceeding or investigation. As one example, legal team members may need to perform a search on the backup data to find all the files that were accessed, modified, created, owned or deleted by a particular user or group of users during a particular time period. Embodiments of the system and method described herein are generally directed to enabling the relevant files to be found in the backup data.

According to one embodiment, a computer-accessible storage medium may store program instructions executable by one or more processors to receive backup data from a file server computer. The backup data may include file data for a plurality of files on the file server computer. The program instructions may be further executable by the one or more processors to receive event data specifying file access event history on the file server, and to create e-Discovery mapping information for the backup data using the event data. The e-Discovery mapping information may map file access events specified by the event data to respective file data in the backup data, which may enable e-Discovery searches to be performed on the backup data. The program instructions may be further executable by the one or more processors to store the e-Discovery mapping information on a storage device.

In some embodiments, each of the file access events in the event data may specify that a respective file was accessed by a respective user at a respective time. The e-Discovery mapping information may map each file access event for a respective file to the file data for the respective file in the backup data.

In some embodiments the event data may include a first file access event and a second file access event for a particular file. The first file access event may specify that the particular file was accessed by a first user at a first time. The second file access event may specify that the particular file was accessed by a second user at a second time. The e-Discovery mapping information may map both the first file access event and the second file access event to the file data for the particular file in the backup data.

In some embodiments the program instructions may be further executable to receive backup catalog information for the backup data. The backup catalog information may specify data locations of the file data for the plurality of files within the backup data. The e-Discovery mapping information may map the file access events specified by the event data to the data locations specified by the backup catalog information.

According to another embodiment, a computer-accessible storage medium may store program instructions executable by one or more processors to store backup data received from a file server computer. The backup data may include file data for a plurality of files on the file server computer. The program instructions may be further executable by the one or more processors to store backup catalog information for the backup data. The backup catalog information may specify data locations of the file data for the plurality of files within the backup data. The program instructions may be further executable by the one or more processors to store event data specifying file access event history on the file server. The program instructions may be further executable by the one or more processors to receive user input specifying an e-Discovery search query to perform on the backup data, and to match the search query to a plurality of file access events specified in the event data. Each of the matching file access events may correspond to a respective file. The program instructions may be further executable by the one or more processors to determine data locations within the backup data for the file data of the files corresponding to the matching file access events. The data locations may be specified by the backup catalog information. In further embodiment the program instructions may also be executable by the one or more processors to display information on a display device indicating the files corresponding to the matching file access events.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Various embodiments of a system and method for enabling electronic discovery (e-Discovery) searches to be performed on backup data in a computer system are disclosed. The backup data may need to be searched to find data files relevant to a legal proceeding or investigation. As one example, legal team members may need to perform a search on the backup data to find all the files that were accessed, modified, created, owned or deleted by a particular user or group of users during a particular time period. Once these files have been identified, the legal team members may evaluate the files and possibly place a legal hold on them.

Embodiments of the system and method described herein are generally directed to enabling the relevant files to be found in the backup data. The backup data may be any kind of backup data, backup image, or data archive created by a backup or archiving software application. Large organizations often have computer systems that use file server computers that store files used by many different users, e.g., where the users access the files through a network from client computers. A backup application may execute to periodically create backup data from the file server computer.

The backup application may create either full backups or incremental backups of the data on the file server computer. A full backup may be a complete representation of a set of files, a storage device, or a data volume on the file server computer as it exists at the time the full backup is created. For example, a full backup may include all of the data of all of the files on a storage device or volume being backed up. Thus, a full backup may be an independent backup that does not depend on any other backup. An incremental backup is a backup that depends on, or is relative to, another backup, e.g., an incremental backup that represents the data that has changed since a previous backup was created. An incremental backup may depend on a full backup (e.g., may represent the data changes that have occurred since the full backup was created) or may depend on another incremental backup (e.g., may represent the data changes that have occurred since the other incremental backup was created). An incremental backup may include the data that has changed since the time when the (full or incremental) backup on which it depends was created, and may not include data that has not changed since the time when the backup on which it depends was created.

In addition to creating the backup data itself (the actual data of the files being backed up from the file server computer), a backup application may also create meta-data describing the backup data, e.g., backup catalog information. The backup catalog information may be used, for example, in the event that the backup data needs to be restored at a later point in time. The backup catalog information may specify the names of the files included in the backup data, the data locations of the file data stored within the backup data, and possibly other information such as the owner of each file. However, the backup catalog information created by conventional backup applications typically does not include sufficient information to enable thorough e-Discovery searches to be performed on the backup data. For example, if a particular file in the backup data was originally created by a user "John Smith" then the backup catalog information may indicate that "John Smith" is the owner of the file. Users other than "John Smith" may have accessed or modified the file, and it may be necessary to discover this fact during an e-Discovery search. However, while the backup catalog information created by conventional backup applications may specify which files are owned by which users, the backup catalog information may not specify which files were accessed (e.g., during read accesses) or modified (e.g., during write accesses) by which users. Also, the catalog information may not specify files that were deleted by users, which may be another important piece of information that needs to be discovered in an e-Discovery search.

Other aspects of the backup data or catalog information created by conventional backup applications may further complicate the use of the catalog information to perform e-Discovery searches. For example, rather than the user's real name or username, the backup catalog information may list the owner of a given file as the user's login ID, which may be different from the user's username. A legal team member performing an e-Discovery search may not know the login ID for a user of interest. As another example, the backup catalog information may list the owner of a given file as the user's SID (Security Identifier), which again may be different from the user's username. Also, some files may be owned by a group instead of a particular user. For example, the backup catalog information may indicate that a file is owned by an Administrators group. A particular user "Jane Doe" may be a member of the Administrators group, but the backup catalog information may not explicitly associate the file with "Jane Doe". Thus, if the backup catalog information is used for an e-Discovery search to find the files owned by "Jane Doe" then this file may not be found.

Figure 1:
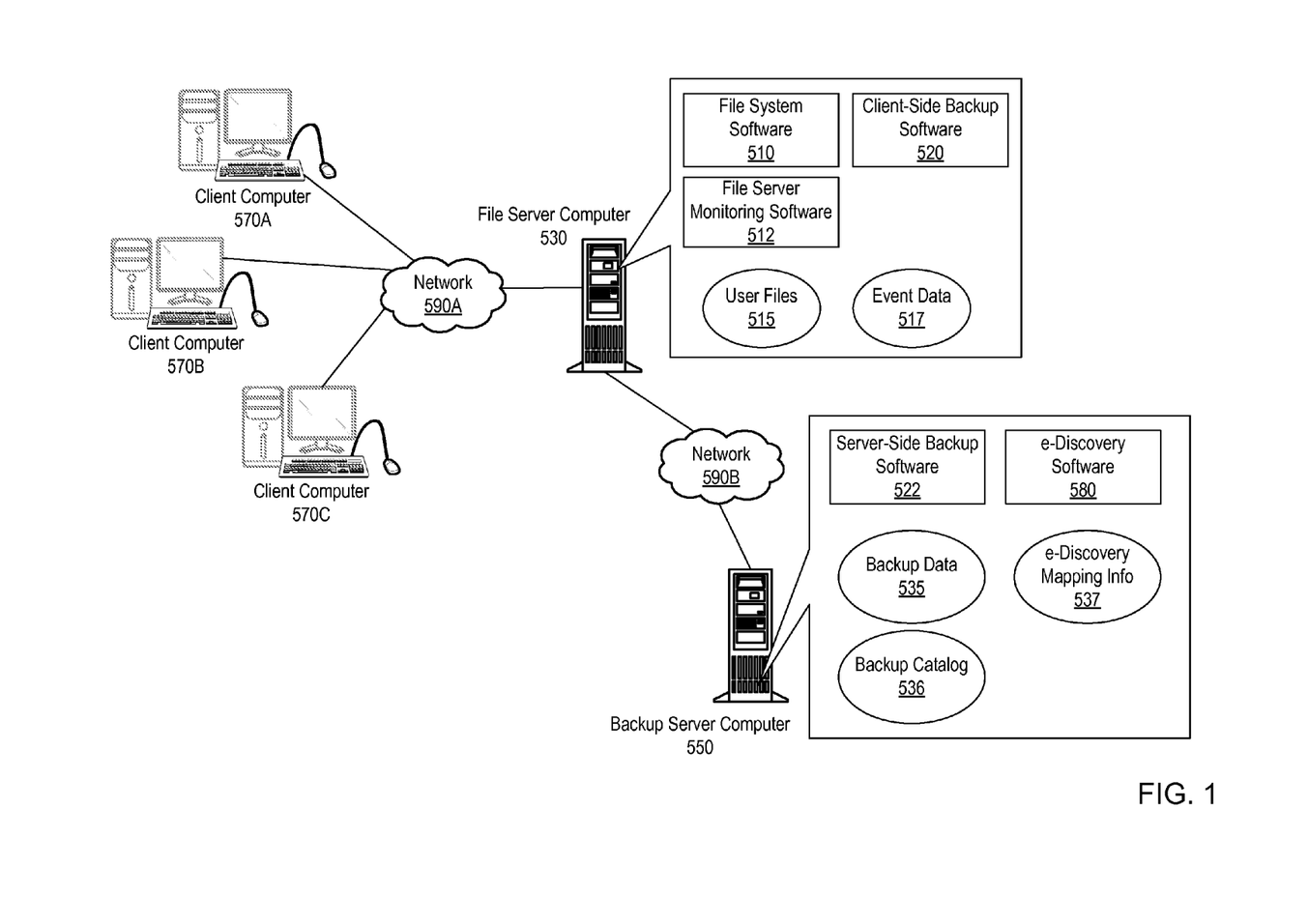
FIG. 1 illustrates one embodiment of a computer system configured to enable e-Discovery searches to be performed on backup data.

Embodiments of the system and method disclosed herein may overcome various problems described above by using additional information to perform e-Discovery searches in conjunction with the backup catalog information created by a backup application. FIG. 1 illustrates one embodiment of the system. The system includes client computers 570A-C coupled by a network 590A to a file server computer 530. The file server computer 530 may execute file system software 510 which manages user data files 515 in response to software applications executing on the client computers 570A-C to create new files, read or modify existing files, delete files, etc. A particular user may be logged in on each of the client computers 570, and thus each of these file access events may be associated with a particular user.

The file server computer 530 may be configured to execute file server monitoring software 512 which monitors the file activity to detect the file access events and store event data 517 logging the events. For example, when a particular user (e.g., software application executing on the user's behalf) accesses a file in order to read the file, the file server monitoring software 512 may store file access event information in the event data 517 indicating the file that was accessed, which user accessed the file, the type of access (e.g., read access), and the time the access was performed. Similarly, when users perform other types of file accesses, such as creating new files, modifying (e.g., writing data to) files, or deleting files, the file server monitoring software 512 may store file access event information in the event data 517 indicating which file was accessed, which user accessed the file, the type of access, and the time the access was performed. In some embodiments the file server monitoring software 512 may also store other information, such as the particular software application that requested the access, and the particular client computer from which the access was requested.

The system may also include one or more backup server computers 550 coupled to the file server computer 530 via a network 590B. The backup server computer(s) 550 may execute server-side backup software 522 that communicates with client-side backup software 520 executing on the file server computer 530 to backup the user files 515 to the backup server computer 550 in the form of backup data 535. The backup data 535 may include full backups and/or incremental backups of the user files 515. For example, the backup software may be configured with a backup policy specifying that a full backup should be performed once a week, with incremental backups being performed at the end of each day, or another desired time schedule. In addition to the backup data 535, the server-side backup software 522 may also create respective backup catalog information 536 for each backup data set which specifies meta-data for the backup data set, such as the names of the files included in the backup data set, the owners of the files, and the data locations of the data for each file.

According to some embodiments, each time a new backup operation is performed to create a respective set of backup data and corresponding backup catalog information, the backup server computer 550 may also receive corresponding event data 517 from the file server computer 530. For example, the backup server computer 550 may query the file server monitoring software 512 or other software on the file server computer 530 at the time of the backup operation or after the backup operation is finished to request information specifying the file access events that occurred since the previous set of backup data was created. Thus, for example, if an incremental backup operation is performed at the end of each day then the backup server computer 550 may communicate with the file server computer 530 (or another computer where the event data 517 is stored) to retrieve the event data specifying all the file access events that occurred since the time when the previous backup data set was created on the previous day.

In some embodiments, at the time each backup operation is performed, the backup-server computer 550 may create e-Discovery mapping information 537 using the backup catalog information 536 and the corresponding event data 517. The e-Discovery mapping information 537 may map the file access events specified by the event data 517 to the respective file data in the backup data 535, e.g., where the data locations of the file data are determined from the backup catalog information 536. For example, for each file access event in the event data 517 specifying that a particular user accessed, modified, or created a particular file at a particular time, the e-Discovery mapping information 537 may map that file access event to the meta-data for the file specified by the backup catalog information 536, e.g., map the file access event to the name of the file and the location of the data for that file within the backup data 535.

The e-Discovery mapping information 537 created during a respective backup operation may enable subsequent e-Discovery searches to be performed on the backup data 535 that was created during the backup operation. In some embodiments the backup server computer 550 may be configured to execute e-Discovery software 580 which is operable to use the e-Discovery mapping information 537 to perform e-Discovery searches on the backup data 535. For example, the e-Discovery software 580 may display a graphical user interface enabling a legal team member or other user to enter a search query requesting to find all the files accessed by a particular user or group of users during a particular time period. In response to the search query, the e-Discovery software 580 may determine which sets of backup data 535 correspond to the specified time period, and may then search the e-Discovery mapping information 537 corresponding to this backup data to match the search query to various file access events specified in the e-Discovery mapping information, e.g., by finding all the file access events associated with the specified user(s). For each file access event that matched the search query, the e-Discovery software 580 may then determine information about the corresponding file, such as the file name and the data locations of the file's data in the backup data 535. The file names may be displayed to the user of the e-Discovery software 580. The e-Discovery software 580 may also perform further actions, such as extracting the file data of the files corresponding to the matching file access events from the backup data 535, and storing copies of the files, which the user of the e-Discovery software 580 may then browse. The user may also request the e-Discovery software 580 to place a legal hold on the files. In response to such a request, the e-Discovery software 580 may modify properties of the extracted files or properties of the backup data 535 to prevent the files or the backup data set from being expired or deleted so that the files will remain available for a legal proceeding or investigation.

FIG. 1 illustrates one particular embodiment of the system, and numerous alternative embodiments are contemplated. In particular, it is noted that the software and hardware architecture of the system may vary in different embodiments. For example, any number of server computers may be used to implement the functions of the server computers shown in FIG. 1. As one example, the functions of the backup server computer 550 may be implemented by separate server computers, such as a media server computer, a master server computer, an index server computer, an e-Discovery server computer, etc.

Also, the server-side backup software 522 and the e-Discovery software 580 may be different software applications that work in conjunction with each other, or may be different modules of the same software application. The functions of creating the e-Discovery mapping information 537 may be performed by the server-side backup software 522 in some embodiments. In some embodiments the e-Discovery software 580 or the server-side backup software 522 may use a third-party indexing service that indexes the e-Discovery mapping information 537 so that it can be efficiently searched.

In some embodiments the e-Discovery mapping information 537 created by the e-Discovery software 580 or the server-side backup software 522 may be kept separate from the backup catalog information 536. In other embodiments the e-Discovery mapping information 537 may be created by directly modifying the backup catalog information 536, e.g., by adding information specified by the event data 517 directly to the backup catalog information 536.

The file server computer 530 may be any kind of file server computer or computer system specialized for hosting user files. Examples of file server computers include NetApp® filers, EMC Corp. file servers, and SharePoint® computers. The functions performed by the file server monitoring software 512 may be implemented in various ways. In some embodiments the file server computer 530 may provide an application programming interface (API) that enables third-party monitoring software to register for and monitor various file access events, or the vendor of the file server computer 530 may provide software that can monitor the file access events. In various embodiments the event data 517 created by the file server monitoring software 512 may be stored in any desired location or storage device. In some embodiments the event data 517 may be stored on a same storage device where the user files 515 are stored, e.g., in a database. In other embodiments the event data 517 may be stored on a different storage device, e.g., one that is directly coupled to the file server computer 530 through a communication bus, or one that is coupled to the file server computer 530 through a storage area network (SAN) or other network.

In various embodiments there may be any number of client computers 570, and they may connect to the file server computer 530 through any kind of network 590A. The backup server computer(s) 550 may also connect to the file server computer 530 through any kind of network 590B. The networks 590A and 590B may include any type of network or combination of networks. For example, the networks may include any type or combination of local area network (LAN), a wide area network (WAN), wireless networks, an Intranet, the Internet, etc. Examples of local area networks include Ethernet networks, Fiber Distributed Data Interface (FDDI) networks, and token ring networks. Also, computer may each be coupled to the network(s) using any type of wired or wireless connection medium. For example, wired mediums may include Ethernet, fiber channel, a modem connected to plain old telephone service (POTS), etc. Wireless connection mediums may include a wireless connection using a wireless communication protocol such as IEEE 802.11 (wireless Ethernet), a modem link through a cellular service, a satellite link, etc.

Figure 2:
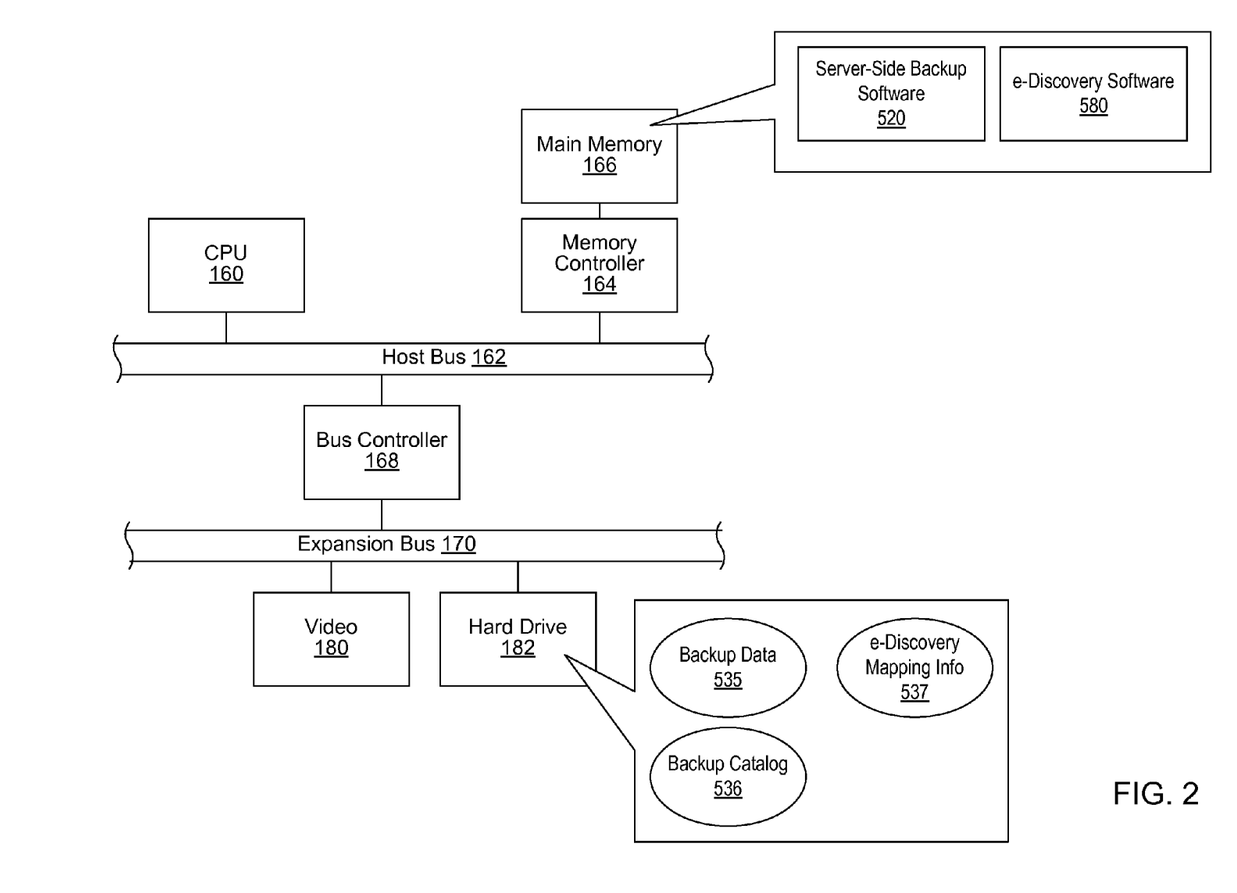
FIG. 2 illustrates one embodiment of a backup server computer used in the computer system of FIG. 1.

FIG. 2 illustrates one embodiment of the backup server computer 550 in more detail. In various embodiments, the server-side backup software 520 and the e-Discovery software 580 may execute on any kind of server computer system (s), such as a personal computer system (PC), workstation, network appliance, or other computing device or combinations of devices. In general, the term "computer" can be broadly defined to encompass any device (or combination of devices) having at least one processor that executes instructions from one or more storage mediums. The backup server computer 550 may have any configuration or architecture, and FIG. 2 illustrates a representative PC embodiment. Elements of a computer not necessary to understand the present description have been omitted for simplicity.

The backup server computer 550 may include at least one central processing unit or CPU (processor) 160 which is coupled to a processor or host bus 162. The CPU 160 may be any of various types. For example, in some embodiments, the processor 160 may be compatible with the x86 architecture, while in other embodiments the processor 160 may be compatible with the SPARC™ family of processors. Also, in some embodiments the backup server computer 550 may include multiple processors 160.

The backup server computer 550 may also include memory 166 in which program instructions implementing the server-side backup software 520 and/or the e-Discovery software 580 are stored. In some embodiments the memory 166 may include one or more forms of random access memory (RAM) such as dynamic RAM (DRAM) or synchronous DRAM (SDRAM). In other embodiments, the memory 166 may include any other type of memory configured to store program instructions. The memory 166 may also store operating system software or other software used to control the operation of the backup server computer 550. The memory controller 164 may be configured to control the memory 166.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. Various devices may be coupled to the expansion or input/output bus 170, such as a video display subsystem 180 which sends video signals to a display device, as well as one or more hard disk drives 182 or other storage device which stores information in a non-volatile manner. The hard disk drive(s) 182 or other storage device(s) may store information such as the backup data 535, the backup catalog information 536, and the e-Discovery mapping information 537.

Figure 3:
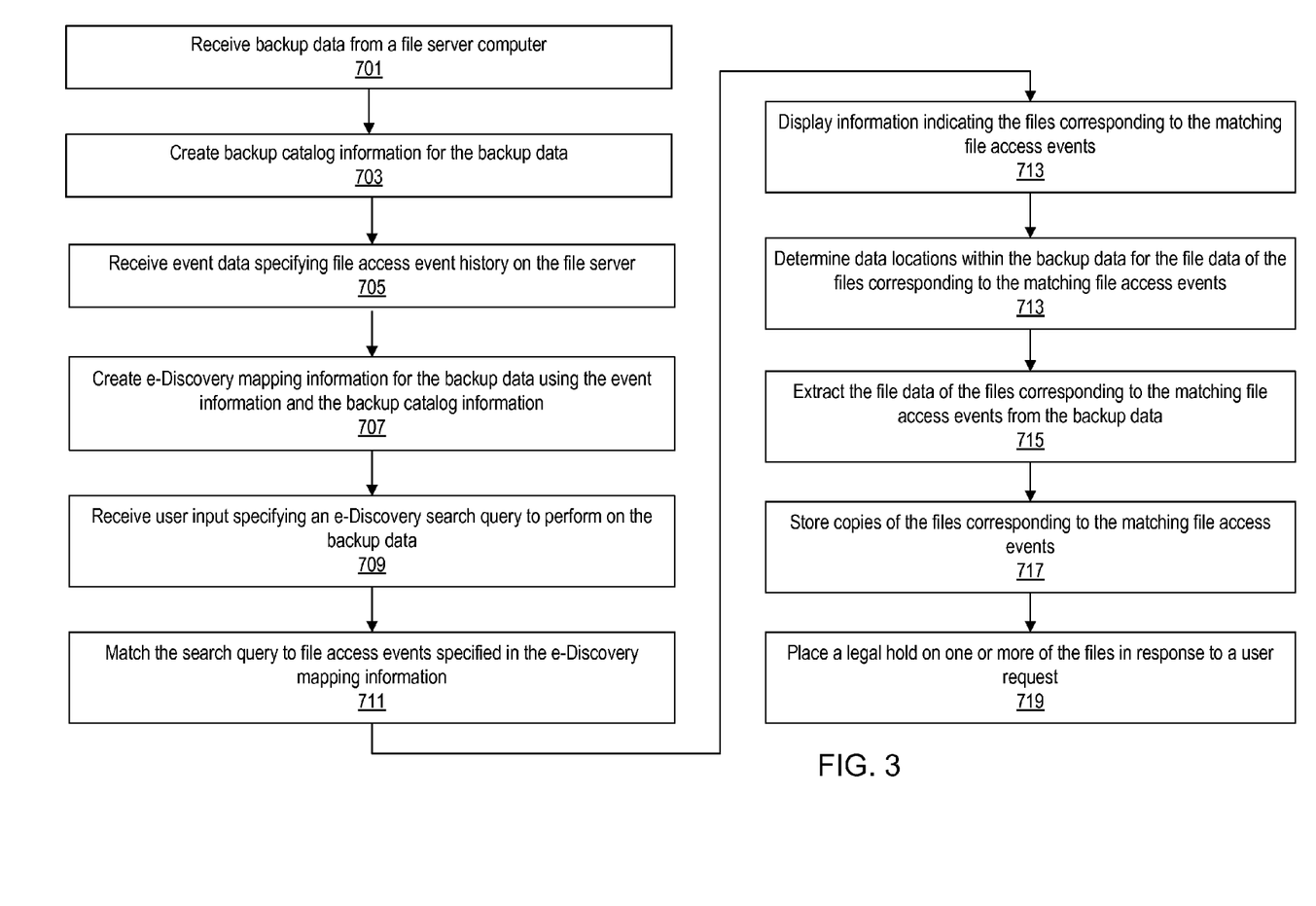
FIG. 3 is a flowchart diagram illustrating one embodiment of a method for enabling and performing an e-Discovery search.
Figure 4:
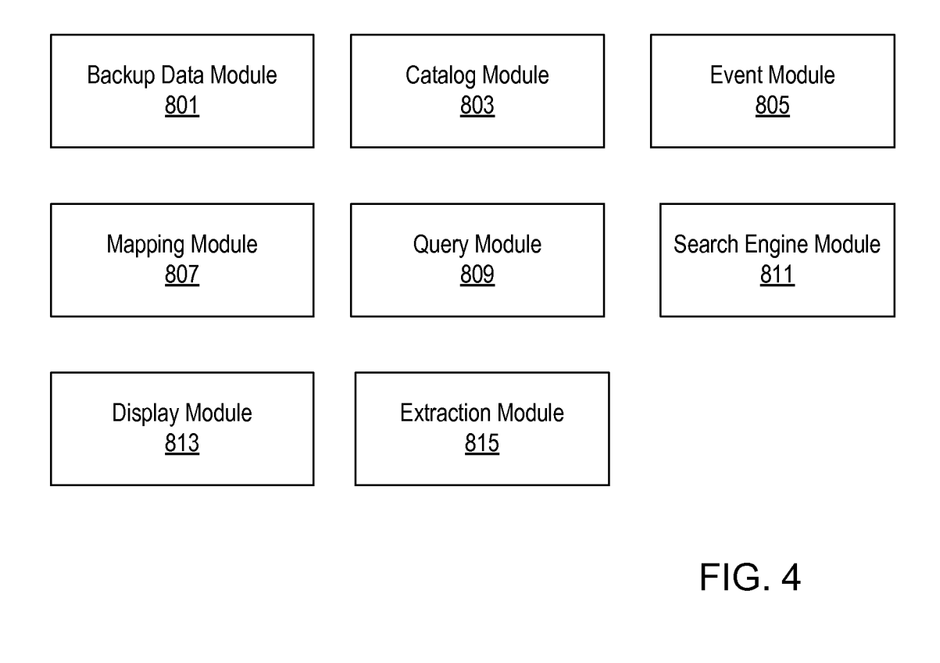
FIG. 4 illustrates various software modules that may execute to perform the functions shown in the flowchart of FIG. 3.

FIG. 3 is a flowchart diagram illustrating one embodiment of a method for enabling and performing an e-Discovery search. The method may be implemented by software executing on one or more computers, such as the server-side backup software 520 and/or e-Discovery software 580 executing on the backup server computer(s) 550, for example. FIG. 4 illustrates various software modules that may execute to perform the functions shown in the flowchart according to some embodiments.

In block 701, backup data may be received from a file server computer by the backup data module 801. The backup data module 801 may store the backup data on a disk drive or other device coupled to a backup server computer. In block 703, backup catalog information for the backup data may be created by the catalog module 803. The backup catalog information may include meta-data describing the backup data that can be used to restore the backup data at a future time, such as the name of the files included in the backup data, the locations of the data for each file in the backup data, and possibly the owner of each file.

In block 705, event data specifying a history of file access events on the file server computer may be received by the event module 805. The event module 805 may communicate with the file server computer from which the backup data originated to receive the event data. In block 707, e-Discovery mapping information for the backup data may be created by the mapping module 807. The e-Discovery mapping information may map the file access events specified by the event data to the respective file data in the backup data, and may enable e-Discovery searches to be performed on the backup data.

At a subsequent time, a user may perform an e-Discovery search on the backup data. In block 709, user input specifying an e-Discovery search query to perform on the backup data may be received by the query module 809. In block 711, the search engine module 811 may match the search query to file access events specified in the e-Discovery mapping information. In block 713, the display module 813 may display information indicating the files corresponding to the matching file access events. In blocks 713, 715 and 717, the extraction module 815 may determine data locations within the backup data for the file data of the files corresponding to the matching file access events, extract the file data of the files corresponding to the matching file access events from the backup data, and store copies of the files corresponding to the matching file access events. The user who performed the e-Discovery search can then review the files that were found, and may possibly place a legal hold on one or more of the files, as indicated in block 719. Placing a legal hold on the files may cause the system to prevent the files from being deleted or prevent the backup data in which the files were found from being expired.

Figure 5:
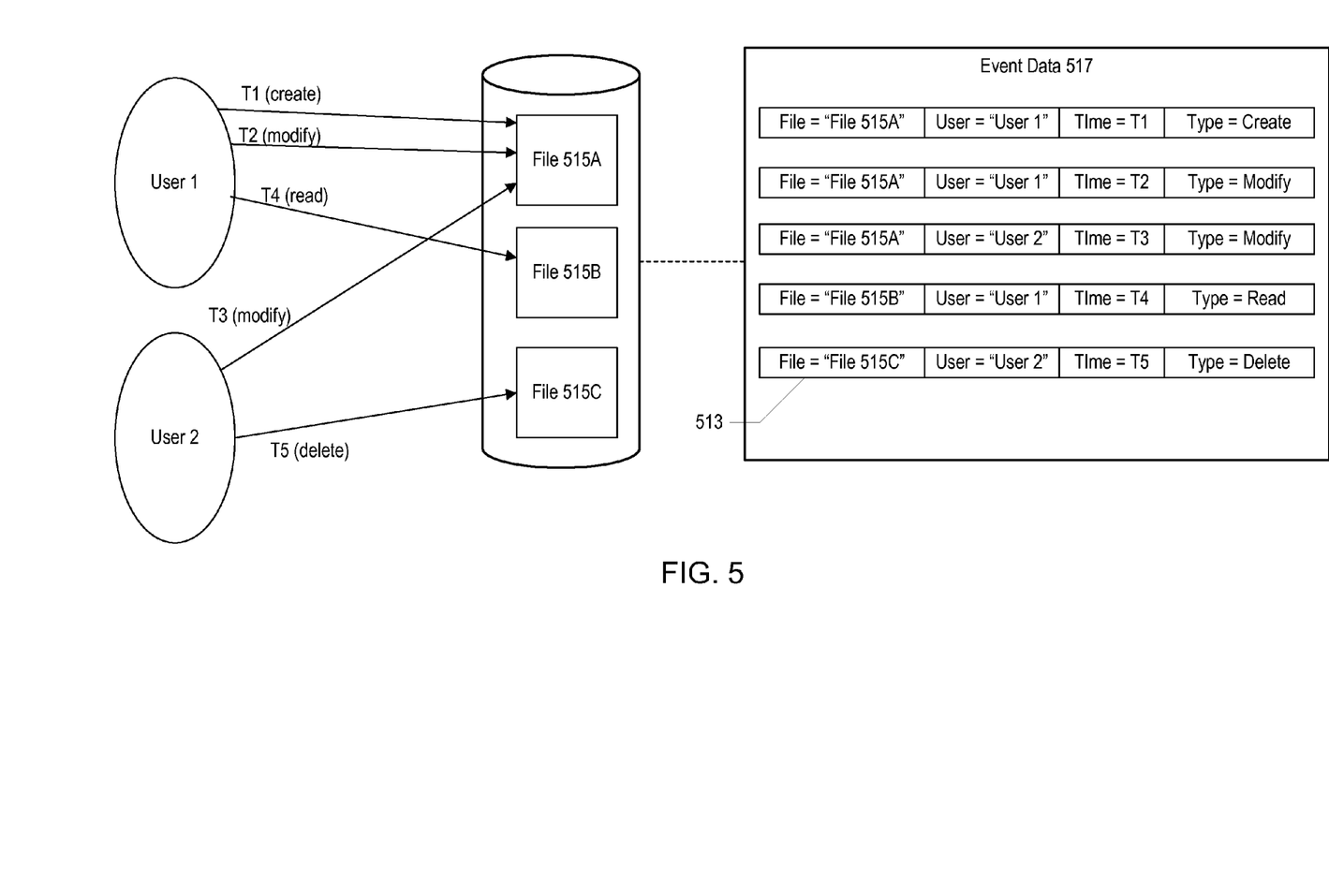
FIG. 5 illustrates an example of file access events that may be stored in response to users accessing files.

FIG. 5 illustrates an example of file access events 513 that may be stored by the file server computer in response to users accessing files from the client computers 570. At time T1 the user 1 creates a new file 515A. In response, the file server computer may log a respective file access event in the event data 517 indicating the type of file accessed that was performed (e.g., a file creation event in this example), the time the event occurred, the file name or file ID of the file that was accessed, and the user who performed the access. At time T2, the user 1 modifies the file 515A. The file server computer may log another file access event indicating this file modification. At time T3, the user 2 modifies the file 515A. At time T4, the user 1 performs a read access on the file 515B. At time T5, the user 2 deletes the file 515C. The file server computer may log a respective file access event for each of these file accesses in the event data 517, as shown in FIG. 5.

Figure 6:
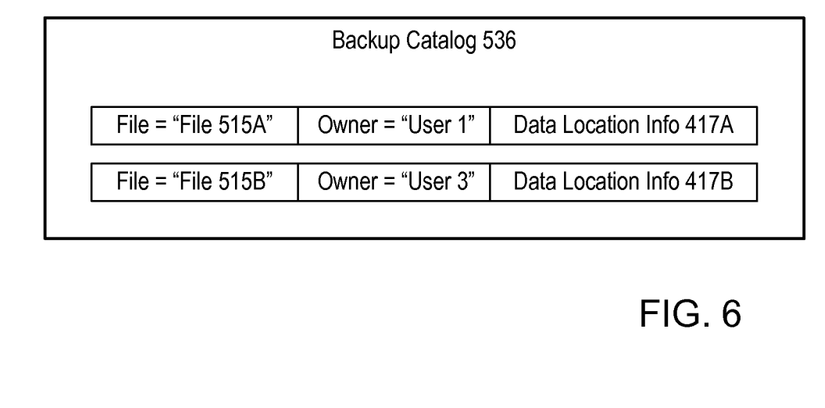
FIG. 6 illustrates an example of a portion of information in a backup catalog that may be created by the backup server computer when a file server computer is backed up.

FIG. 6 illustrates an example of a portion of the information in a backup catalog 536 that may be created by the backup server computer when the file server computer is backed up. The data for the files stored on the file server computer may be backed up to the backup server computer, and the backup catalog 536 may include meta-data for each respective file, such as the name of the file, the owner of the file (e.g., which user created the file), and the data location information 417 which specifies where the data for each file can be found within the backup data. In other embodiments the meta-data for each file may include additional information, such as the creation time of the file, last modification time of the file, etc.

Figure 7:
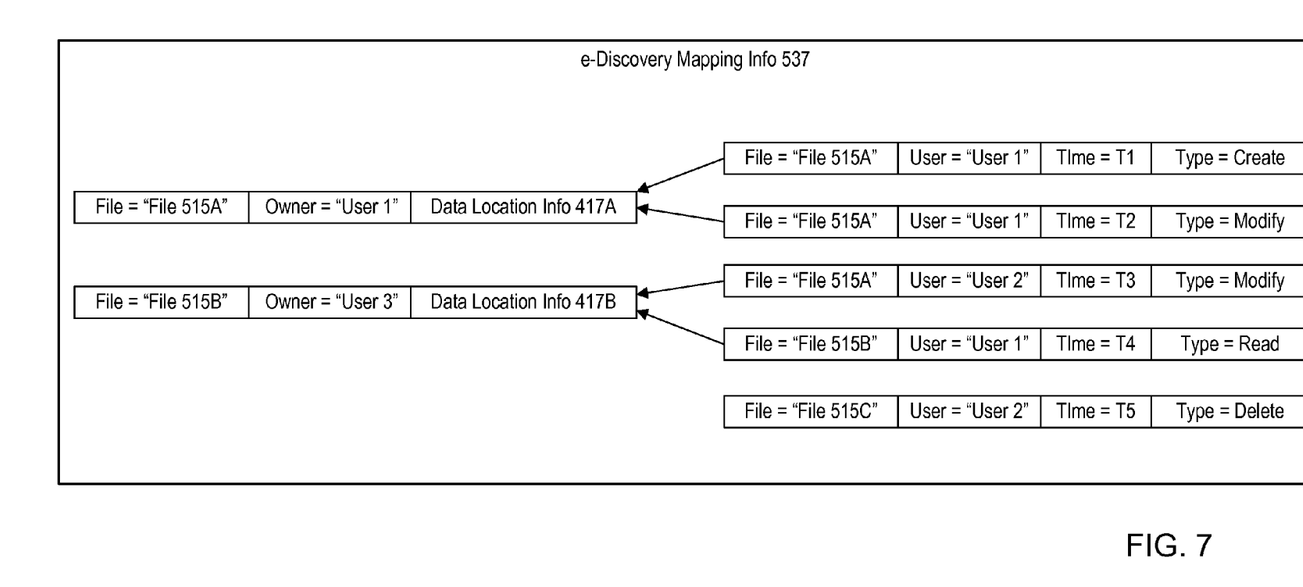
FIG. 7 illustrates an example of a portion of e-Discovery mapping information that may be created based on the event data of FIG. 5 and the backup catalog information of FIG. 6.

FIG. 7 illustrates an example of a portion of the e-Discovery mapping information 537 that may be created by the backup server computer based on the event data 517 of FIG. 5 and the backup catalog information 536 of FIG. 6. Each of the file access events corresponding to the files 515A and 515B have been mapped to the backup catalog information 536 for the respective files. Since the file 515C was deleted before the backup operation was performed, the file 515C may not have been backed up to the file server computer, and the backup catalog 536 may not contain information for the file 515C. However, the file deletion and any other access events that occurred on the file prior to its deletion may be determined from the event data 517 and included in the e-Discovery mapping information 537. Thus, if a legal team member later performs an e-Disovery search to find the files accessed by the user 2, the system may use the e-Discovery mapping information 537 to discover not only the file modification performed on the file 515A at the time T3, but also the file deletion performed on the file 515C at the time T5. If the backup server computer also stores previous backup data sets then the e-Discovery software may be able to extract the file 515C from a previous data set so that the legal team member can see what was deleted.

As mentioned above, in some embodiments, e-Discovery mapping information 537 may be created at the time a backup operation is done, e.g., as part of the backup operation. Thus, for each backup data set, respective e-Discovery mapping information may be stored in addition to the backup data and backup catalog so that it is already available at a later time in the event that an e-Discovery search needs to be performed. This may enable e-Discovery searches to be performed quickly. This may also enable the event data that specifies the file access history to be deleted after the e-Discovery mapping information is created, if the event data is not needed for other applications.

In other embodiments the e-Discovery mapping information 537 may not be created at the time a backup operation is done. Instead, the e-Discovery mapping information may only be created in the event that it is necessary to actually perform an e-Discovery search on the backup data. The system may save the event data that specifies the file access history to ensure that it will be available at a later time to use in response to e-Discovery searches. The event data may be stored or archived in various places, such as the file server computer, backup server computer, or another computer system. If a legal team member enters an e-Discovery search query to find files pertaining to a particular time period, then the system may lookup the backup data, backup catalog information, and the event data corresponding to that time period. The system may then dynamically use the backup catalog information and the event data to determine which files in the backup data match the user's query. In some embodiments the system may be able to use the backup catalog information and the event data directly to find the files matching the search query. For example, if the search query is to find all the files accessed by a particular user then the system may first search the event data to find the file access events pertaining to the user. The system may then search the backup catalog information to find the meta-data for the files corresponding to these file access events. The meta-data may then be used to locate the files within the backup data. In other embodiments, the system may create new mapping information at the time a search query is entered, e.g., by creating new data based on the backup catalog information and the event data, or by transforming the backup catalog information and/or the event data. For example, the backup catalog information and the event data may be provided to an indexing service that creates new e-Discovery mapping information, and the system may then perform a search on the e-Discovery mapping information to find the files matching the search query.

Dynamically mapping the event data to the backup catalog information in response to an e-Discovery search query may mean that it takes longer to perform an e-Discovery search than if the e-Discovery search information were pre-created and pre-stored at the time of the backup operation because it can take some time to create the e-Discovery mapping information. However, in some systems, e-Discovery searches may not need to be performed often, whereas backup operations may be performed frequently. It may thus be desirable to implement the e-Discovery searches this way in order to make the backup operations more efficient by eliminating the time needed to create the e-Discovery mapping information for each backup operation.

Figure 8:
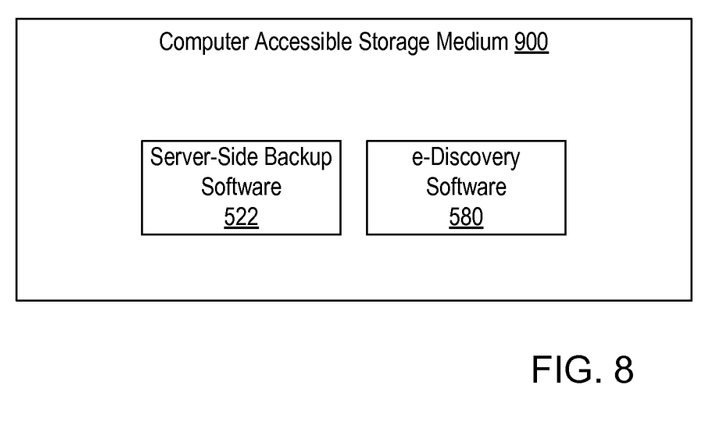
FIG. 8 is a block diagram of a computer accessible storage medium which may store program instructions associated with server-side backup software and/or e-Discovery software.

Turning now to FIG. 8, a block diagram of a computer accessible storage medium 900 is shown. The computer accessible storage medium 900 may store program instructions executable by one or more processors to implement various functions described above, such as program instructions associated with the server-side backup software 522 and/or the e-Discovery software 580. Generally, the computer accessible storage medium 900 may store any set of instructions which, when executed, implement a portion or all of the functions performed by one or more backup server computers 550 as described above.

Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, a flash memory interface (FMI), a serial peripheral interface (SPI), etc. Storage media may include microelectromechanical systems (MEMS), as well as storage media accessible via a communication medium such as a network and/or a wireless link. A carrier medium may include computer accessible storage media as well as transmission media such as wired or wireless transmission.

Numerous variations and modifications will become apparent to those skilled in the art once the above disclosure is fully appreciated. It is intended that the following claims be interpreted to embrace all such variations and modifications.

What is claimed is:

1. A non-transitory computer-accessible storage medium storing program instructions executable by one or more processors to:
   receive backup data from a file server computer, wherein the backup data includes file data for a plurality of files on the file server computer;
   receive event data specifying a plurality of file access events that have occurred on the file server, wherein the event data indicates a respective user and a respective file with which each of the file access events is associated;
   create mapping information based on the event data and the backup data, wherein in creating the mapping information, the program instructions are executable by the one or more processors to perform the following for each respective file access event of at least a subset of the plurality of file access events specified by the event data: a) determine the respective file with which the respective file access event is associated; b) determine respective file data in the backup data that corresponds to the respective file with which the respective file access event is associated; and c) store information mapping the respective file access event to the respective file data in the backup data;
   wherein the event data specifies a first file access event for a particular file, wherein the first file access event indicates that the particular file was accessed by a first user at a first time, wherein the event data also specifies a second file access event for the particular file, wherein the second file access event indicates that the particular file was accessed by a second user at a second time, wherein the mapping information maps the first file access event and the second file access event to the respective file data for the particular file in the backup data;
   receive backup catalog information for the backup data, wherein the backup catalog information specifies where the file data for each file of the plurality of files is stored in the backup data;
   receive user input specifying a search query to perform on the backup data;
   match the search query to one or more of the file access events in the at least a subset of the plurality of file access events; and
   for each respective file access event of the one or more file access events matching the search query, use the mapping information to lookup the respective file data in the backup data that corresponds to the respective file with which the respective file access event is associated;
   wherein said receiving the user input specifying the search query comprises receiving user input requesting to search the backup data to find files deleted by a particular user during a particular time period;
   wherein said matching the search query to the one or more file access events comprises determining that each of the one or more file access events specifies that a particular file was deleted by the particular user during the particular time period;
   wherein the one or more file access events matching the search query include the first file access event indicating that the particular user performed a read access on the particular file at the first time, wherein the particular file corresponds to particular file data in the backup data, wherein the program instructions are executable by the one or more processors to examine the backup catalog information to lookup the particular file data in the backup data in response to determining that the first file access event matches the search query.

2. The computer-accessible storage medium of claim 1, wherein the event data further indicates a respective time at which each of the file access events occurred.

3. The computer-accessible storage medium of claim 1, wherein the program instructions are further executable by the one or more processors to receive backup catalog information for the backup data, wherein the backup catalog information specifies where the file data for each file of the plurality of files is stored in the backup data;
   wherein for each respective file access event of the at least a subset of the plurality of file access events specified by the event data, the program instructions are executable by the one or more processors to examine the backup catalog information to determine where the respective file data corresponding to the respective file associated with the respective file access event is stored in the backup data.

4. The computer-accessible storage medium of claim 3, wherein the program instructions are executable by the one or more processors to create the mapping information by adding the event data to the backup catalog information.

5. The computer-accessible storage medium of claim 1, wherein said receiving the user input specifying the search query comprises receiving user input requesting to search the backup data to find files accessed by a particular user during a particular time period;
   wherein said matching the search query to the one or more file access events comprises determining that the one or more file access events are associated with the particular user and occurred during the particular time period.

6. The computer-accessible storage medium of claim 1, wherein the first file access event indicates that the first user performed a read access on the particular file at the first time.

7. A non-transitory computer-accessible storage medium storing program instructions executable by one or more processors to:
   store backup data received from a file server computer, wherein the backup data includes file data for a plurality of files on the file server computer;
   store backup catalog information for the backup data, wherein the backup catalog information specifies where the file data for each file of the plurality of files is stored in the backup data;
   receive event data specifying a plurality of file access events that have occurred on the file server, wherein the event data indicates a respective user and a respective file with which each of the file access events is associated;
   create mapping information based on the event data and the backup data, wherein in creating the mapping information, the program instructions are executable by the one or more processors to perform the following for each respective file access event of at least a subset of the plurality of file access events specified by the event data: a) determine the respective file with which the respective file access event is associated; b) determine respective file data in the backup data that corresponds to the respective file with which the respective file access event is associated; and c) store information mapping the respective file access event to the respective file data in the backup data;

wherein the event data specifies a first file access event for a particular file, wherein the first file access event indicates that the particular file was accessed by a first user at a first time, wherein the event data also specifies a second file access event for the particular file, wherein the second file access event indicates that the particular file was accessed by a second user at a second time, wherein the mapping information maps the first file access event and the second file access event to the respective file data for the particular file in the backup data;

receive user input specifying a search query to perform on the backup data;

match the search query to one or more file access events of the plurality of file access events;

for each respective file access event of the one or more file access events matching the search query:
  examine the backup catalog information to lookup the respective file data in the backup data that corresponds to the respective file with which the respective file access event is associated; and
  display information on a display device indicating the respective file with which the respective file access event is associated;

wherein the one or more file access events matching the search query include the first file access event indicating that a particular user performed a read access on a particular file at the first time, wherein the particular file corresponds to particular file data in the backup data, wherein the program instructions are executable by the one or more processors to examine the backup catalog information to lookup the particular file data in the backup data in response to determining that the first file access event matches the search query;

wherein said receiving the user input specifying the search query comprises receiving user input requesting to find files deleted by the particular user during a particular time period;

wherein said matching the search query to the one or more file access events comprises determining that at least a subset of the one or more file access events specifies that the particular file was deleted by the particular user during the particular time period.

8. The computer-accessible storage medium of claim 7, wherein the program instructions are further executable by the one or more processors to:
  extract the file data of the files corresponding to the matching file access events from the backup data; and
  store copies of the files corresponding to the matching file access events on a storage device.

9. The computer-accessible storage medium of claim 7,
  wherein said receiving the user input specifying the search query comprises receiving user input requesting to search the backup data to find files accessed by the particular user during a particular time period;
  wherein said matching the search query to the one or more file access events comprises determining that the one or more file access events are associated with the particular user and occurred during the particular time period.

10. A system comprising:
  one or more processors; and
  memory storing program instructions, wherein the program instructions are executable by the one or more processors to:
    receive backup data from a file server computer, wherein the backup data includes file data for a plurality of files on the file server computer;
    receive event data specifying a plurality of file access events that have occurred on the file server, wherein the event data indicates a respective user and a respective file with which each of the file access events is associated;
    create mapping information based on the event data and the backup data, wherein in creating the mapping information, the program instructions are executable by the one or more processors to perform the following for each respective file access event of at least a subset of the plurality of file access events specified by the event data:
      a) determine the respective file with which the respective file access event is associated; b) determine respective file data in the backup data that corresponds to the respective file with which the respective file access event is associated; and c) store information mapping the respective file access event to the respective file data in the backup data;

wherein the event data specifies a first file access event for a particular file, wherein the first file access event indicates that the particular file was accessed by a first user at a first time, wherein the event data also specifies a second file access event for the particular file, wherein the second file access event indicates that the particular file was accessed by a second user at a second time, wherein the mapping information maps the first file access event and the second file access event to the respective file data for the particular file in the backup data;

receive backup catalog information for the backup data, wherein the backup catalog information specifies where the file data for each file of the plurality of files is stored in the backup data;

receive user input specifying a search query to perform on the backup data;

match the search query to one or more of the file access events in the at least a subset of the plurality of file access events;

for each respective file access event of the one or more file access events matching the search query, use the mapping information to lookup the respective file data in the backup data that corresponds to the respective file with which the respective file access event is associated;

wherein said receiving the user input specifying the search query comprises receiving user input requesting to search the backup data to find files deleted by a particular user during a particular time period;

wherein said matching the search query to the one or more file access events comprises determining that each of the one or more file access events specifies that a particular file was deleted by the particular user during the particular time period; and wherein the one or more file access events matching the search query include the first file access event indicating that the particular user performed a read access on the particular file at the first time, wherein the particular file corresponds to particular file data in the backup data, wherein the program instructions are executable by the one or more processors to examine the backup catalog information to lookup the particular file data in the backup data in response to determining that the first file access event matches the search query.

11. The system of claim 10,
wherein the event data further indicates a respective time at which each of the file access events occurred.

12. The system of claim 10, wherein said receiving the user input specifying the search query comprises receiving user input requesting to search the backup data to find files accessed by a particular user during a particular time period;
wherein said matching the search query to the one or more file access events comprises determining that the one or more file access events are associated with the particular user and occurred during the particular time period.

\* \* \* \* \*